US010637549B2

(12) United States Patent
Cherian et al.

(10) Patent No.: US 10,637,549 B2
(45) Date of Patent: Apr. 28, 2020

(54) METHODS AND SYSTEMS FOR COORDINATING DISTRIBUTED MIMO COMMUNICATIONS

(71) Applicant: QUALCOMM Incorporated, San Diego, CA (US)

(72) Inventors: George Cherian, San Diego, CA (US); Simone Merlin, San Diego, CA (US); Alfred Asterjadhi, San Diego, CA (US); Yan Zhou, San Diego, CA (US); Abhishek Pramod Patil, San Diego, CA (US); Venkata Ramanan Venkatachalam Jayaraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 15/835,231

(22) Filed: Dec. 7, 2017

(65) Prior Publication Data
US 2018/0205434 A1 Jul. 19, 2018

Related U.S. Application Data

(60) Provisional application No. 62/447,314, filed on Jan. 17, 2017.

(51) Int. Cl.
*H04B 7/06* (2006.01)
*H04B 7/0452* (2017.01)
(Continued)

(52) U.S. Cl.
CPC .......... *H04B 7/0613* (2013.01); *H04B 7/024* (2013.01); *H04B 7/0452* (2013.01); *H04B 7/2684* (2013.01); *H04B 7/2665* (2013.01); *H04B 7/2668* (2013.01); *H04B 7/2671* (2013.01); *H04W 52/0216* (2013.01); *H04W 72/121* (2013.01); *H04W 74/0808* (2013.01); *H04W 74/0816* (2013.01); *H04W 74/0825* (2013.01); *H04W 84/12* (2013.01)

(58) Field of Classification Search
CPC combination set(s) only.
See application file for complete search history.

(56) References Cited

U.S. PATENT DOCUMENTS

2014/0321436 A1* 10/2014 Kwon ............... H04L 5/0085
370/336
2015/0131640 A1* 5/2015 Seok ................ H04W 28/06
370/338
(Continued)

OTHER PUBLICATIONS

International Search Report and Written Opinion—PCT/US2017/068662—ISA/EPO—dated Mar. 22, 2018.

Primary Examiner — Khaled M Kassim
Assistant Examiner — Syed Ali
(74) Attorney, Agent, or Firm — Steven R. Thiel; Paradice and Li LLP

(57) ABSTRACT

Methods and systems for coordinating simultaneous transmission by two or more access points over a single channel of a wireless medium are disclosed. In one aspect, a method includes determining, by a first access point, a time when the first access point and a second access point will transmit simultaneously over the channel, and transmitting, by the first access point, over the channel at the time.

16 Claims, 8 Drawing Sheets

(51) Int. Cl.
*H04B 7/26* (2006.01)
*H04B 7/024* (2017.01)
*H04W 84/12* (2009.01)
*H04W 74/08* (2009.01)
*H04W 52/02* (2009.01)
*H04W 72/12* (2009.01)

(56) References Cited

U.S. PATENT DOCUMENTS

| | | |
|---|---|---|
| 2015/0295629 A1 | 10/2015 | Xia et al. |
| 2015/0381676 A1* | 12/2015 | Seok .................. H04W 4/06 370/315 |
| 2016/0197655 A1* | 7/2016 | Lee .................. H04B 7/024 370/338 |
| 2016/0261327 A1 | 9/2016 | Merlin et al. |
| 2016/0338047 A1* | 11/2016 | Seok ................ H04W 72/0413 |
| 2018/0338325 A1* | 11/2018 | Ryu .................... H04W 74/085 |
| 2019/0123798 A1* | 4/2019 | Lou .................... H04B 7/0456 |
| 2019/0174554 A1* | 6/2019 | Deenoo ................ H04W 80/02 |
| 2019/0349857 A1* | 11/2019 | Kim .................... H04W 80/02 |
| 2020/0029276 A1* | 1/2020 | Kim ................ H04W 52/0206 |

\* cited by examiner

METHODS AND SYSTEMS FOR COORDINATING DISTRIBUTED MIMO COMMUNICATIONS

CROSS REFERENCE TO RELATED APPLICATION(S)

This application claims the benefit of U.S. Provisional Application No. 62/447,314 titled "METHODS AND SYSTEMS FOR COORDINATING DISTRIBUTED MIMO COMMUNICATIONS," filed Jan. 17, 2017. The content of this prior application is considered part of this application and is hereby incorporated by reference in its entirety.

TECHNICAL FIELD

This application relates generally to wireless communication, and more specifically to systems and methods for performing synchronized access in distributed MIMO wireless communication.

BACKGROUND

Wireless communications systems are widely deployed to provide various types of communication content such as voice, video, packet data, messaging, broadcast, and so on. Wi-Fi or WiFi (e.g., IEEE 802.11) is a technology that allows electronic devices to connect to a wireless local area network (WLAN). A WiFi network may include an access point (AP) that may communicate with one or more other electronic devices (e.g., computers, cellular phones, tablets, laptops, televisions, wireless devices, mobile devices, "smart" devices, etc.), which can be referred to as stations (STAs). The AP may be coupled to a network, such as the Internet, and may enable one or more STAs to communicate via the network or with other STAs coupled to the AP.

Many wireless networks utilize carrier-sense multiple access with collision detection (CSMA/CD) to share a wireless medium. With CSMA/CD, before transmission of data on the wireless medium, a device may listen to the medium to determine whether another transmission is in progress. If the medium is idle, the device may attempt a transmission. The device may also listen to the medium during its transmission, so as to detect whether the data was successfully transmitted, or if perhaps a collision with a transmission of another device occurred. When a collision is detected, the device may wait for a period of time and then re-attempt the transmission. The use of CSMA/CD allows for a single device to utilize a particular channel (such as a spatial or frequency division multiplexing channel) of a wireless network.

Users continue to demand greater and greater capacity from their wireless networks. For example, video streaming over wireless networks is becoming more common. Video teleconferencing may also place additional capacity demands on wireless networks. In order to satisfy the bandwidth and capacity requirements users require, improvements in the ability of a wireless medium to carry larger and larger amounts of data are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In certain embodiments, a method coordinates simultaneous transmission of two or more access points over a single channel of a wireless medium. The method comprises determining, by a first access point, a time when the first access point and at least one second access point will transmit simultaneously over the channel. The method further comprises transmitting, by the first access point, a data portion of a distributed MIMO communication over the channel at the time.

In certain embodiments a method coordinates transmission by a plurality of access points over a single channel of a wireless medium. The method comprises determining, by a device, a time when a first access point and at least one second access point will transmit simultaneously over the channel. The method further comprises transmitting, by the device, a trigger message.

In certain embodiments, an apparatus for wireless communication comprises an electronic hardware processor configured to coordinate simultaneous transmission of two or more access points over a single channel of a wireless medium. The electronic hardware processor is configured to determine a time when the first access point and at least one second access point will transmit simultaneously over the channel. The electronic hardware processor is further configured to transmit a data portion of a distributed MIMO communication over the channel at the time.

In certain embodiments, an apparatus for wireless communication comprises an electronic hardware processor configured to coordinate transmission by a plurality of access points over a single channel of a wireless medium. The electronic hardware processor is configured to determine a time when a first access point and at least one second access point will transmit simultaneously over the channel. The electronic hardware processor is further configured to transmit a trigger message.

In certain embodiments, a non-transitory computer-readable medium comprising instructions that, when executed, perform a method for coordinating simultaneous transmission of two or more access points over a single channel of a wireless medium. The method comprises determining, by a first access point, a time when the first access point and at least one second access point will transmit simultaneously over the channel. The method further comprises transmitting, by the first access point, a data portion of a distributed MIMO communication over the channel at the time.

In certain embodiments, a non-transitory computer-readable medium comprising instructions that, when executed, perform a method of coordinating transmission by a plurality of access points over a single channel of a wireless medium. The method comprises determining, by a device, a time when a first access point and at least one second access point will transmit simultaneously over the channel. The method further comprises transmitting, by the device, a trigger message.

DETAILED DESCRIPTION

Figure 1:
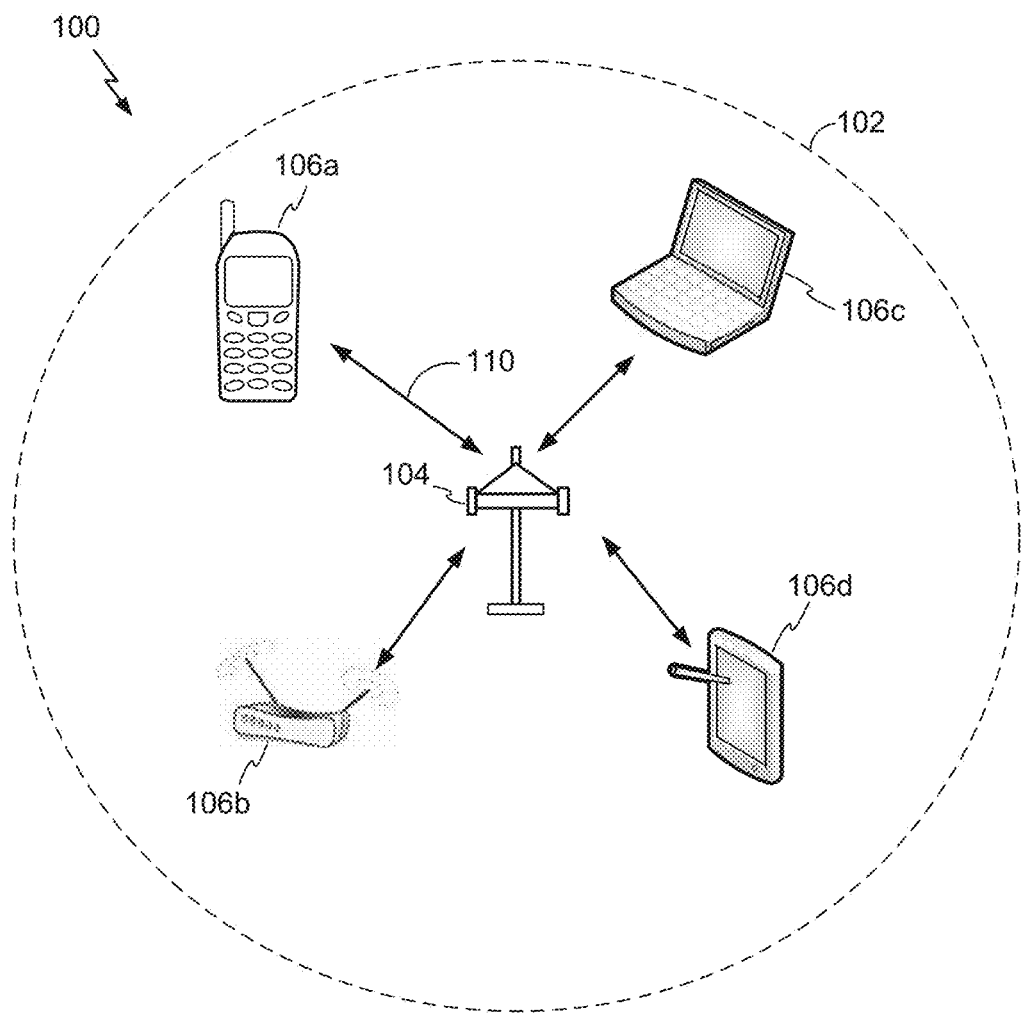
FIG. 1 schematically illustrates an example wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently or combined with any other aspect of the disclosure. In addition, the scope is intended to cover such an apparatus or method which is practiced using other structure and functionality as set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein.

Wireless access network technologies may include various types of wireless local area access networks (WLANs). A WLAN may be used to interconnect nearby devices together, employing widely used access networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be: access points ("APs") and clients (also referred to as stations, or "STAs"). In general, an AP serves as a hub or a base station for the STAs in the WLAN. A STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area access networks. In some implementations an STA may also be used as an AP.

An access point ("AP") may comprise, be implemented as, or known as a NodeB, Radio Access network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a Node-B (Base-station), or any other suitable device that is configured to communicate via a wireless medium.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 is described in documents from an organization named "3rd Generation Partnership Project 2" (3GPP2). These various radio technologies and standards are known in the art.

FIG. 1 is a diagram that illustrates a multiple-access multiple-input multiple-output (MIMO) system 100 with APs and STAs. For simplicity, only one AP 104 is shown in FIG. 1. As described above, the AP 104 communicates with the STAs 106a-d (also referred to herein collectively as "the STAs 106" or individually as "the STA 106") and may also be referred to as a base station or using some other terminology. Also as described above, a STA 106 may be fixed or mobile and may also be referred to as a user terminal, a mobile station, a wireless device, or using some other terminology. The AP 104 may communicate with one or more STAs 106 at any given moment on the downlink or uplink. The downlink (i.e., forward link) is the communication link from the AP 104 to the STAs 106, and the uplink (i.e., reverse link) is the communication link from the STAs 106 to the AP 104. A STA 106 may also communicate peer-to-peer with another STA 106.

Portions of the following disclosure will describe STAs 106 capable of communicating via Spatial Division Multiple Access (SDMA). Thus, for such aspects, the AP 104 may be configured to communicate with both SDMA and non-SDMA STAs. This approach may conveniently allow older versions of STAs (e.g., "legacy" STAs) that do not support SDMA to remain deployed in an enterprise, extending their useful lifetime, while allowing newer SDMA STAs to be introduced as deemed appropriate.

The MIMO system 100 may employ multiple transmit and multiple receive antennas for data transmission on the downlink and uplink. The AP 104 is equipped with Nap antennas and represents the multiple-input (MI) for downlink transmissions and the multiple-output (MO) for uplink transmissions. A set of K selected STAs 106 collectively represents the multiple-output for downlink transmissions and the multiple-input for uplink transmissions. For pure SDMA, it is desired to have Nap≤K≤1 if the data symbol streams for the K STAs are not multiplexed in code, frequency or time by some means. K may be greater than Nap if the data symbol streams can be multiplexed using TDMA technique, different code channels with CDMA, disjoint sets of sub-bands with OFDM, and so on. Each selected STA may transmit user-specific data to and/or receive user-specific data from the AP. In general, each selected STA may be equipped with one or multiple antennas (i.e., Nut 1). The K selected STAs can have the same number of antennas, or one or more STAs may have a different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each STA may be equipped with a single antenna (e.g., in order to keep costs down) or multiple antennas (e.g., where the additional cost can be supported). The MIMO system 100 may also be a TDMA system if the STAs 106 share the same frequency channel by dividing transmission/reception into different time slots, where each time slot may be assigned to a different STA 106.

Figure 2:
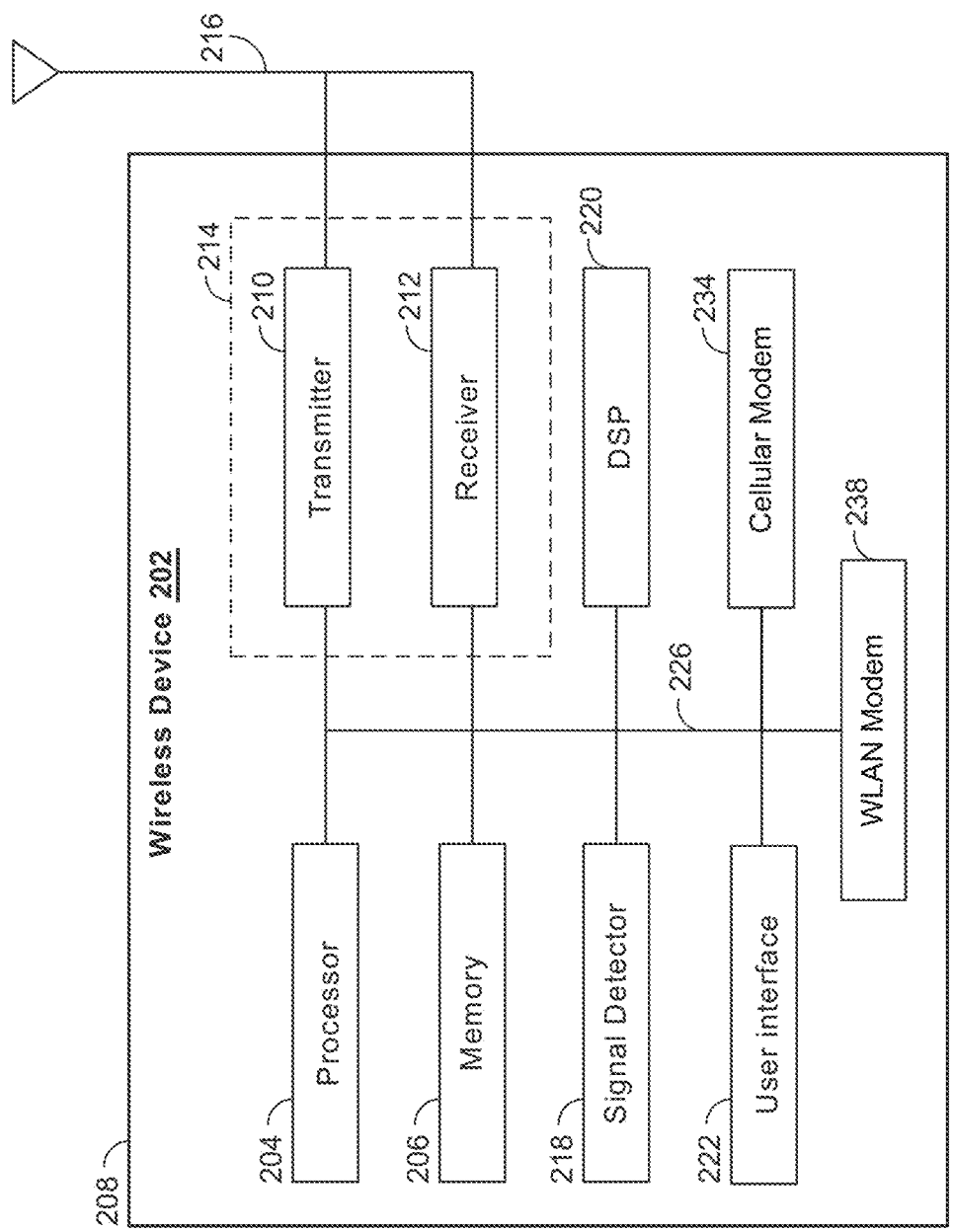
FIG. 2 schematically illustrates an example wireless device that may be employed within the example wireless communication system of FIG. 1.

FIG. 2 illustrates various components that may be utilized in a wireless device 202 that may be employed within the wireless communication MIMO system 100. The wireless device 202 is an example of a device that may be configured to implement the various methods described herein. The wireless device 202 may implement an AP 104 or a STA 106.

The wireless device 202 may include an electronic hardware processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more electronic hardware processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transceiver antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. In some aspects, the wireless device may also include one or more of a user interface component 222, cellular modem 234, and a wireless lan (WLAN) modem. The cellular modem 234 may provide for communication using cellular technologies, such as CDMA, GPRS, GSM, UTMS, or other cellular networking technology. The modem 238 may provide for communications using one or more WiFi technologies, such as any of the IEEE 802.11 protocol standards.

The various components of the wireless device 202 may be coupled together by a bus system, which may include a power bus, a control signal bus, and a status signal bus in addition to a data bus.

Certain aspects of the present disclosure support transmitting an uplink (UL) signal or a downlink (DL) signal between one or more STAs and an AP. In some embodiments, the signals may be transmitted in a multi-user MIMO (MU-MIMO) system. Alternatively, the signals may be transmitted in a multi-user FDMA (MU-FDMA) or similar FDMA system. In some aspects, these signals may be transmitted over one or more of the transmitter 210 and the modem 238.

Figure 3:
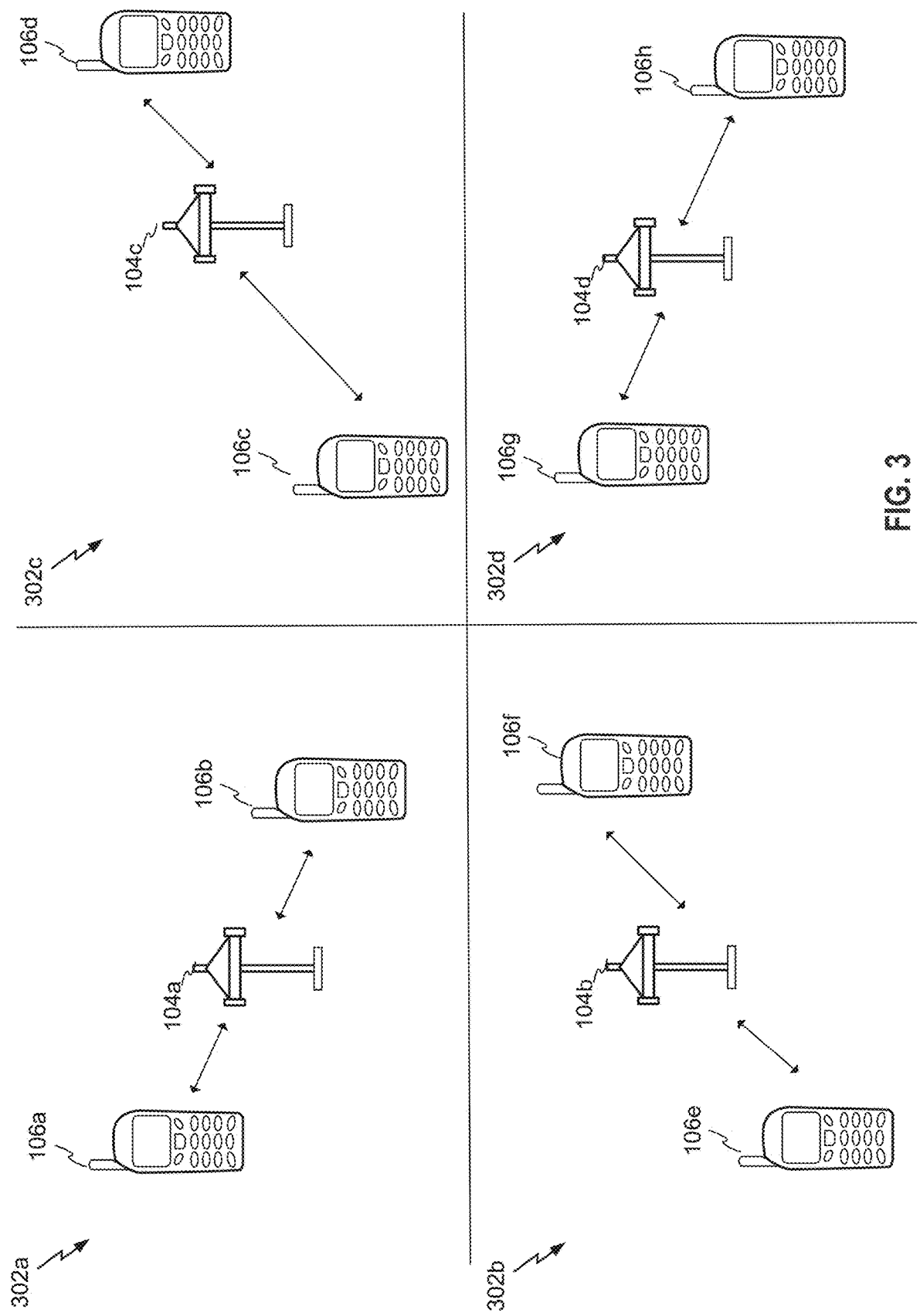
FIG. 3 schematically illustrates an example configuration of a distributed MIMO wireless communication system in accordance with certain embodiments described herein.

FIG. 3 shows four basic service sets (BSSs) 302a-d, each BSS including an access point 104a-d respectively. Each access point 104a-d is associated with at least two stations within its respective BSS 302a-d. AP 104a is associated with STA 106a-b. AP 104b is associated with STA 106c-d. AP 104c is associated with STA 106e-f. AP 104d is associated with STAs 106g-h. An AP that is associated with a STA may be referred to as a BSS AP for the STA throughout this disclosure. Similarly, an AP for which there is no association with a particular STA may be referred to as an OBSS AP for the STA throughout this disclosure. Associations between an AP and one or more stations provides for, in part, coordination of communication between devices within the basic service set (BSS) defined by the AP and its associated STAs. For example, devices within each BSS may exchange signals with each other. The signals may function to coordinate transmissions from the respective AP 104a-d and stations within the AP's BSS 302a-d.

The devices shown in FIG. 3, including the AP's 104a-d and STA 106a-h, also share a wireless medium. Sharing of the wireless medium is facilitated, in some aspects, via the use of carrier sense media access with collision detection (CSMA/CD). The disclosed embodiments may provide for a modified version of CSMA/CD that provides for an increase in an ability for the BSSs 302a-d to communicate simultaneously when compared to known systems.

The stations 106a-h within the BSSs 302a-d may have different abilities to receive transmissions from their associated AP based, at least in part, on their position relative to the other APs and/or stations outside their respective BSS (OBSS). For example, because the stations 106a, 106d, 106e, and 106h are positioned relatively far from OBSS APs, these stations may have an ability to receive transmissions from their BSS AP even with an OBSS AP or STA is transmitting. Stations having such receive characteristics may be referred to as Reuse STAs throughout this disclosure.

In contrast, STAs 106b, 106c, 106f, and 106g are illustrated in positions that are relatively close to an OBSS AP. Thus, these stations may have less ability to receive transmissions from their BSS AP during transmissions from OBSS AP's and/or OBSS STAs. Stations having such receive characteristics may be referred to as non-reuse or edge STAs throughout this disclosure. In some aspects, the disclosed methods and systems may provide for an improved ability for the non-reuse STAs to communicate concurrently while other OBSS devices are also communicating on the wireless medium.

In at least some of the disclosed aspects, two or more of the APs 104a-d may negotiate to form a cluster of access points. In other aspects, cluster configurations may be defined via manual configuration. For example, each AP may maintain configuration parameters indicating whether the AP is part of one or more cluster, and if so, a cluster identifier for the cluster. In some aspects, the configuration may also indicate whether the AP is a cluster controller for the cluster. In some of the embodiment disclosed herein, a cluster controller may take on functions that differ from APs that are part of the cluster but are not a cluster controller. Thus, in some aspects, two or more of APs 104a-d may be included in the same cluster. STAs associated with those access points may also be considered to be included in or part of the cluster of their associated AP. Therefore, in some aspects the STAs a-h illustrated above may be part of the same cluster.

The cluster of access points may coordinate transmissions between themselves and their associated APs. In some aspects, the cluster may be identified via a cluster identifier that uniquely identifies the group of access points comprising the cluster. In some aspects, during association of a station with any of the APs in a cluster, the cluster identifier is transmitted to the station during association, for example, in an association response message. The station may then utilize the cluster identifier to coordinate communications within the cluster. For example, one or more messages transmitted over the wireless network may include the cluster identifier, which a receiving STA may use to determine whether the message is addressed to it or not.

Embodiments that cluster of access points may also utilize various methods to identify STAs within the cluster. For example, as known methods of generating association identifiers (AIDs) may not provide uniqueness across access points, in some aspects, media access control (MAC) addresses may be utilized to identify stations where appropriate. For example, known messages including user info fields that utilize association identifiers to identify stations may be modified to contain data derived from station MAC addresses in the disclosed embodiments. Alternatively, methods of generating association identifiers may be modified to ensure uniqueness within a cluster of access points. For example, a portion of the association identifier may uniquely identify an access point within the cluster. Stations associated with that access point would be assigned association identifiers including the unique identification. This provides unique association identifiers across access points within a cluster. In some other aspects, an association identifier within a cluster may include the cluster identifier. This may provide for uniqueness across clusters to facilitate future cross-cluster coordination of communication.

Figure 4:
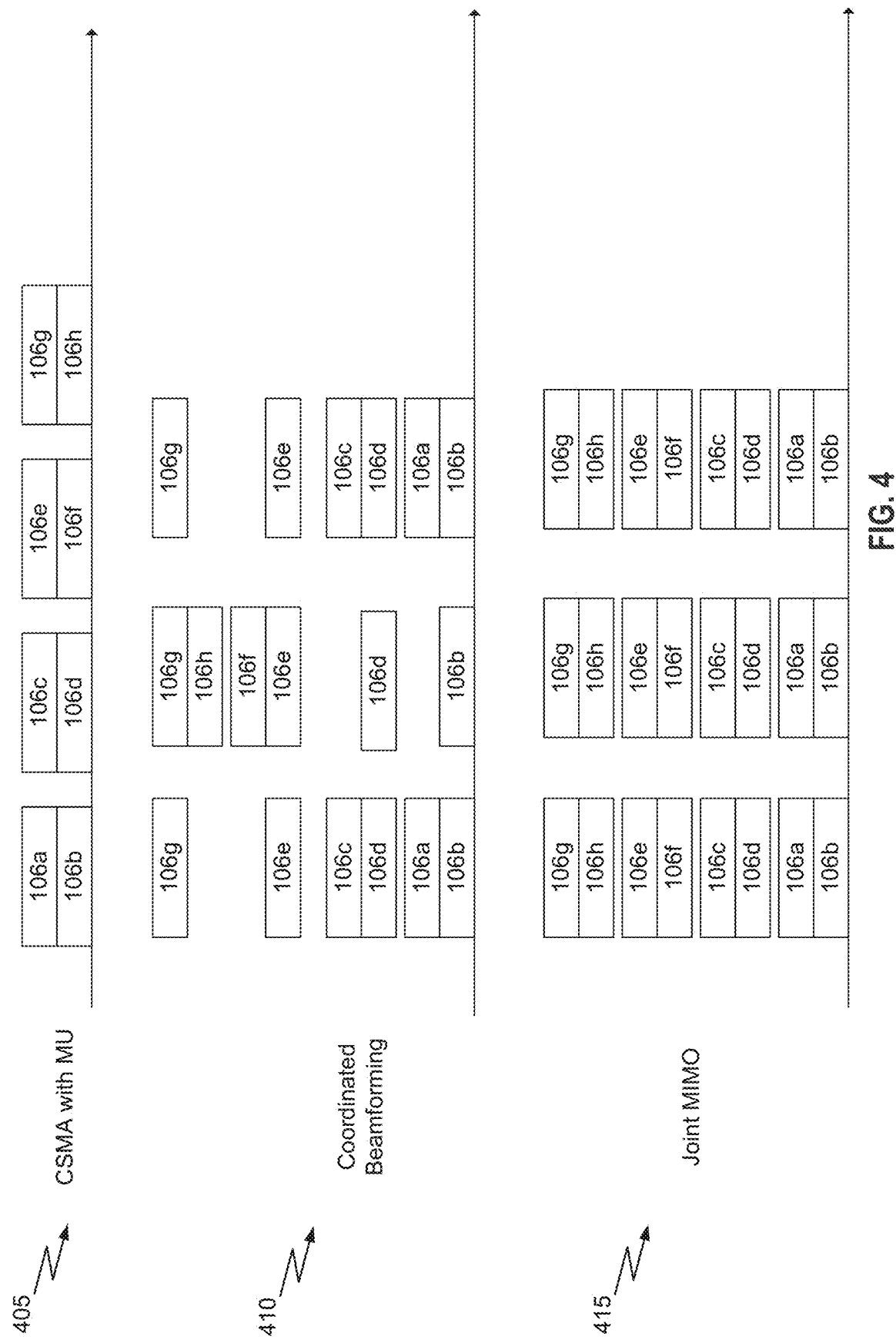
FIG. 4 schematically illustrates example communication options compatible with a distributed MIMO wireless communication system in accordance with certain embodiments described herein.

FIG. 4 shows three exemplary approaches to arbitrating the wireless medium with the communications system 300 of FIG. 3. Approach 405 utilizes carrier sense media access (CSMA) to perform single BSS multi-user transmissions. For example, each of transmissions 420a-d may be performed by the BSSs 302a-d of FIG. 3 respectively. The use of traditional CSMA in approach 405 causes the medium to be utilized by only one BSS at any point in time.

Approach 410 utilizes coordinated beamforming. With the coordinated beamforming approach 410, the APs 104a-d may coordinate transmissions between their respective BSSs. In some aspects, this coordination may be performed over the wireless medium, or in some aspects, over a back-haul network. In these aspects, the coordination traffic over the backhaul network provided for improved utilization of the wireless medium.

With this approach, reuse STAs for different BSSs may be scheduled to transmit or receive data concurrently. For example, a relative strength of a communication channel between STA 106*a* and AP 104*a* may allow these two devices to exchange data simultaneously with communication with OBSS devices, such as, for example, AP 104*b* and STA 106*d*. In addition, approach 410 provides for non-reuse STAs may be scheduled to transmit concurrently with OBSS devices. For example, STA 106*b*, which is within BSS 302, may be scheduled to communicate simultaneously with communication between AP 104*d* and STA 106*h* of BSS 302*d*. Such simultaneous communication between a non-reuse STA (such as STA 106*b*) and, for example, AP 104*d* may be facilitated by scheduling AP 104*d* to transmit a signal to STA 106*b* simultaneous with AP 104*d*'s transmission to STA 106*h*. For example, AP 104*d* may transmit a null signal for dominant interfering signals to STA 106*b*. Thus, while transmitting a first signal to STA 106*h*, AP 104*d* may simultaneously transmit a signal nulling the first signal to STA 106*b*. Such simultaneous transmission by the AP 104*d* may be provided by selecting individual antenna(s) of a plurality of antennas provided by AP 104*d* for each of the transmissions.

Approach 415 shows an exemplary joint multi-user communication or a distributed MIMO communication across access points 104*a-d* within the BSSs 302*a-d*. With this joint MIMO approach 415, a cluster of APs (such as APs 104*a-d*) may service N 1-SS STAs simultaneously, where N is ~¾ of a total number of antennas across all APs within the cluster. Distributed MIMO communications may coordinate a collection of antennas across the multiple APs within a cluster to transmit to stations within the cluster. Thus, while traditional MIMO methods allocate transmit antennas within a single BSS to stations within the BSS, distributed MIMO provides for allocation of transmit antennas outside a BSS to facilitate communications with stations within the BSS.

In a distributed MIMO communication, a station in one BSS may communicate with one or more access points in another, different BSS. Thus, for example, station 106*a* of BSS 302*a* of FIG. 3 may communication with access point 104*d*, which is in BSS 302*d*. This communication may occur simultaneously with communication between STA 106*a* and AP 104*a*, the BSS AP of the STA 106*a*. In some aspects of an uplink distributed MIMO communication, the STA 106*a* may conduct one or more uplink communications to AP 104*a* simultaneously with AP 104*d*. Alternatively, a downlink distributed MIMO communication may include AP 104*a* transmitting data to STA 106*a* simultaneously with a transmission from AP 104*d* to STA 106*a*.

Thus, one or more of the distributed embodiments may utilize MIMO in the form of Cooperative Multipoint (CoMP, also referred to as e.g. Network MIMO (N-MIMO), Distributed MIMO (D-MIMO), or Cooperative MIMO (Co-MIMO), etc.) transmission, in which multiple access points maintaining multiple corresponding basic service sets, can conduct respective cooperative or joint communications with one or more STAs 106. CoMP communication between STAs and APs can utilize for example, a joint processing scheme, in which an access point associated with a station (a BSS AP) and an access point that is not associated with a station (a OBSS AP) cooperate to engage in transmitting downlink data to the STA and/or jointly receiving uplink data from the STA. Additionally or alternatively, CoMP communication between an STA and multiple access points can utilize coordinated beamforming, in which a BSS AP and an OBSS AP can cooperate such that an OBSS AP forms a spatial beam for transmission away from the BSS AP and, in some aspects, at least a portion of its associated stations, thereby enabling the BSS AP to communicate with one or more of its associated stations with reduced interference.

To facilitate the coordinated beamforming approach 410 or the joint MIMO approach 415, an understanding of channel conditional between an access point and OBSS devices may provide for greater wireless communication efficiency.

Figure 5:
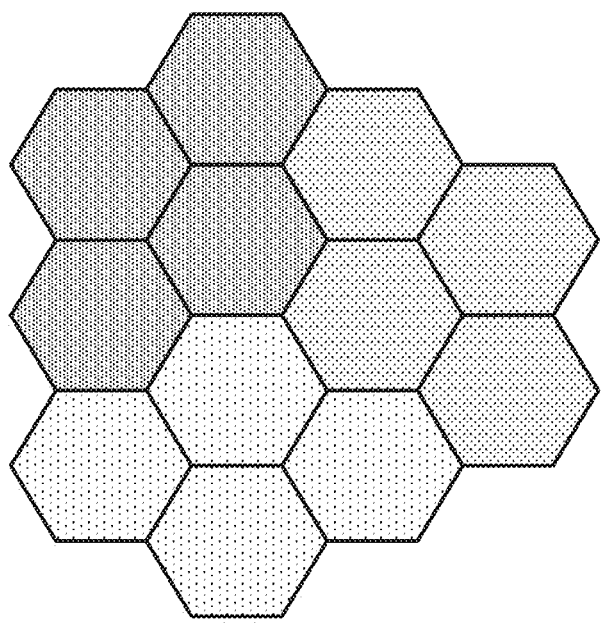
FIG. 5 schematically illustrates an example plurality of basic service sets (BSSs) of a distributed MIMO wireless communication system grouped into clusters in accordance with certain embodiments described herein.

FIG. 5 schematically illustrates a plurality of basic service sets (BSSs) 500 of an exemplary distributed MIMO wireless communication system. Each hexagon of FIG. 5 represents an access point and associated stations, collectively referred to as a basic service set (BSS). The individual BSSs are grouped into clusters in accordance with certain embodiments described herein. In the example schematically illustrated by FIG. 5, a first cluster (C1) comprises four BSSs, a second cluster (C2) comprises four BSSs, and a third cluster (C3) comprises four BSSs. In certain other embodiments, a cluster can comprise 2, 3, 4, 5, or any numbers of BSSs and a wireless communication system can comprise one or more clusters (e.g., 2, 3, 4, 5 or other numbers of clusters).

In certain embodiments, to perform distributed MIMO communications, devices within two or more BSSs of a cluster may transmit over a single channel simultaneously (e.g., transmit data from a plurality of access points of the BSS simultaneously via the single channel, or transmit data from a plurality of stations in different BSSs simultaneously to a single AP). In some aspects, a centralized scheduler (not shown) may coordinate transmissions across the clusters C1-C3. For example, coordination may include selecting which devices will transmit simultaneously from multiple BSSs to perform a joint MIMO communication.

Figure 6:
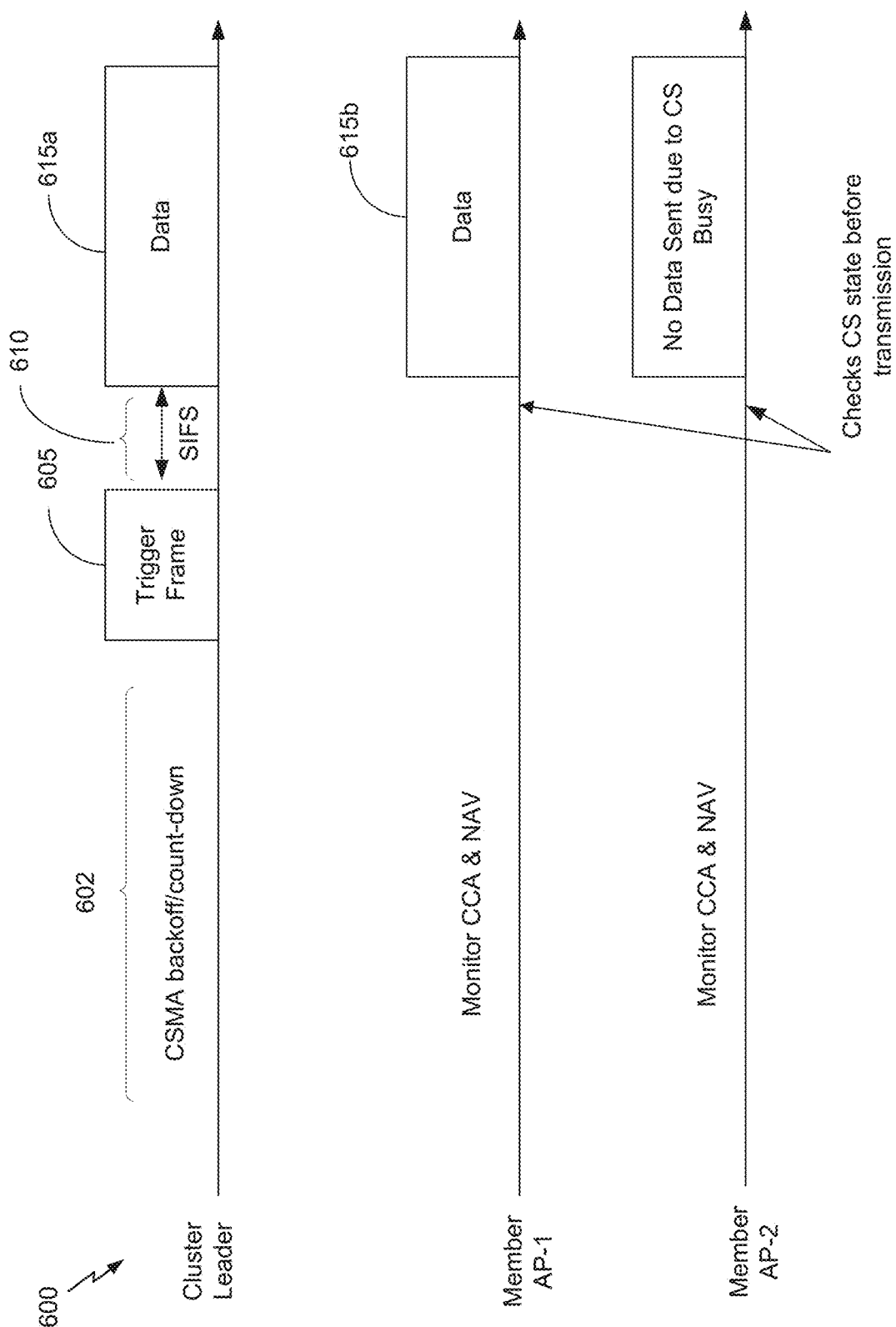
FIG. 6 schematically illustrates an example scheme for providing synchronized access within a cluster in accordance with certain embodiments described herein.
Figure 7:
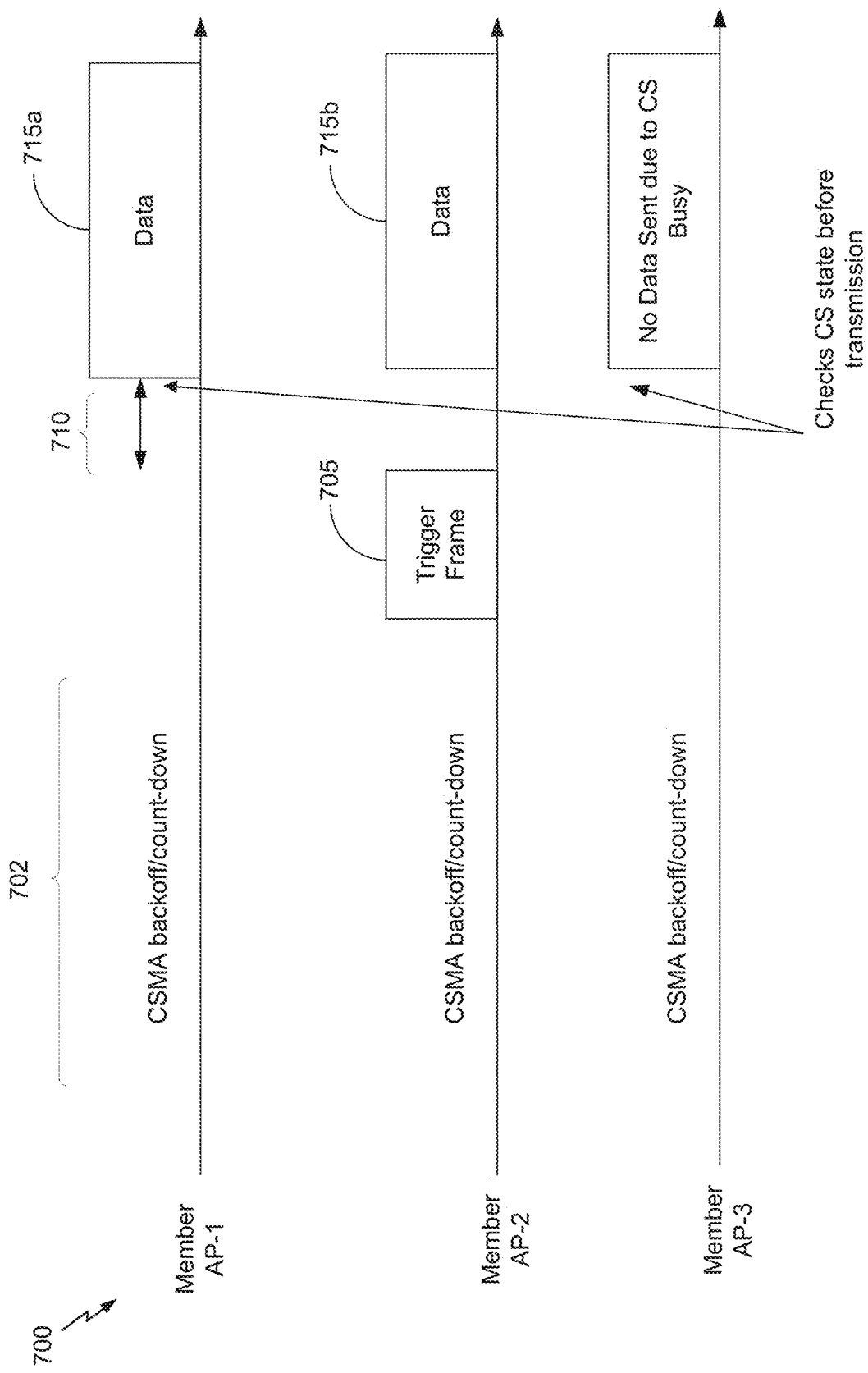
FIG. 7 schematically illustrates another example scheme for providing synchronized access within a cluster in accordance with certain embodiments described herein.

FIGS. 6 and 7 schematically illustrate two corresponding example schemes for providing synchronized access to a single communications channel within a cluster in accordance with certain embodiments described herein. In some embodiments utilizing the schemes of FIGS. 6 and 7, Wi-Fi channel access rules are for an unlicensed band (other examples in accordance with certain embodiments described herein may use different assumptions). The cluster can comprise a plurality of access points and a plurality of stations, and can be a wireless network or a portion of a wireless network. In certain embodiments, a message (e.g., a "frame," a "trigger frame," a "first message," a "first frame," a "first trigger frame," etc.) may be transmitted from a component of the cluster (e.g., from an access point of the plurality of access points or from a station of the plurality of stations). As one example, the trigger frame 605 or 705 may be sent from one AP to multiple APs. In certain embodiments, the trigger frame 605 or 705 is received by an access point (e.g., from one of the other access points) and in response, at least in part, to the trigger frame, the receiving access point can set the time to a predetermined time value (e.g., a time value that is specified in a standard; a time value that is calculated by the access point) or a time value indicated by the trigger frame (e.g., the trigger frame indicates via one or more fields having one or more predetermined values, a time for a first access point and a second access point to simultaneously transmit data on a single channel of the wireless network). As described herein, in certain embodiments, the trigger frame 605 or 705 is used to solicit transmissions from access points which receive the trigger frame 605 or 705. The trigger frame 605 or 705 may be an extension of a frame described in a particular Standard, for example, the "Trigger-Frame" (e.g., for addressing multiple STAs) as described in IEEE 802.11ax. The trigger frame 605 or 705 may be a frame or an extension of a frame described in one or more subsequent Standards.

In certain embodiments, as schematically illustrated by FIGS. 6 and 7, the trigger frame 605 or 705 is transmitted by an access point. In certain other embodiments, the trigger frame 605 or 705 is transmitted by a designated station (e.g., a previously-determined designated station; a station selected to be the determined station through communication or negotiation between two or more components of the wireless network).

As schematically illustrated by FIG. 6, an access point of the plurality of access points can be designated as the "cluster leader." For example, the cluster leader can be a previously-determined access point, the selection can be cloud-controlled, the selection can be over-the-air negotiated (e.g., selected through communication or negotiation between two or more components of the wireless network, such as two or more of the access points), or the selection can be based on MAC addresses of the access points (e.g., a lowest MAC address or a highest MAC address). The cluster leader can transmit the trigger frame to one or more other access points of the plurality of access points to initiate coordinated transmission from multiple access points. For example, as schematically illustrated by FIG. 6, after performing a carrier sensed multiple access (CSMA) backoff procedure/count-down procedure, the cluster leader can transmit the trigger frame to one or more other access points of the plurality of access points. As described herein, the CSMA backoff procedure may simply be referred to as "backoff procedure," "CSMA backoff procedure," "count-down procedure," etc. Further details regarding the backoff procedure are described in connection with FIG. 7 below.

After having transmitted the trigger frame 605, the cluster leader can transmit data (e.g., downlink data) 615a on the single channel at the time indicated by the trigger frame 605 respectively. In certain embodiments, the cluster leader can determine the time based on the time of trigger frame 605 transmission by the cluster leader and a constant elapsed time after the time of trigger frame transmission. For example, the time separation between trigger frame 605 transmission and data transmission can be a predefined time (e.g., short interframe space or SIFS). Similarly, the one or more other access points that receive the trigger frame 605 can determine the time based on the time of trigger frame transmission by the cluster leader (or based on the time of trigger frame receipt by the access point) and the same constant elapsed time (e.g., SIFS) after the time of trigger frame 605 transmission (or receipt).

In response, at least in part, to the trigger frame 605 received from the cluster leader, at least some of the one or more other access points of the plurality of access points can transmit data (e.g., downlink data) 615b on the single channel at the time indicated by the trigger frame 605 respectively. This data transmission 615b from the one or more other non-leader access points can then be synchronized (e.g., simultaneous) with the data transmission 615a by the cluster leader on the single channel. Each of the one or more non-leader access points (e.g., "member AP-1" and "member AP-2" of FIG. 6) of the plurality of access points may perform a corresponding checking procedure (e.g., monitoring both physical CCA and virtual NAV) to check whether its carrier sense (CS) state is busy before transmitting data on the single channel. As schematically illustrated by FIG. 6, "member AP-1" determines that its CS state is not busy during time period 610, so in response, at least in part, "member AP-1" performs the data transmission 615b on the single channel, while "member AP-2" determines that its CS state is busy during time period 610, so in response, at least in part, "member AP-2" does not perform a data transmission on the single channel.

As schematically illustrated by FIG. 7, in certain other embodiments, none of the access points are designated as the "cluster leader." Instead, any of the access points of the plurality of access points may transmit the trigger frame 705 to one or more other access points to initiate coordinated data transmission from multiple access points. In certain embodiments, each of the access points can perform a CSMA backoff procedure/count-down procedure during time period 702, and an access point completing its respective back off procedure first may transmit the trigger frame 705. For example, as schematically illustrated by FIG. 7, one of the access points (e.g., "member AP-2") is the first to complete performing its CSMA backoff procedure/count-down procedure, and this access point is illustrated then transmitting the trigger frame 705 to one or more other access points (e.g., "member AP-1" and "member AP-3"). In certain embodiments, the plurality of access points will perform procedures to avoid collisions (e.g., reduce the probability of collisions) of multiple trigger frames being transmitted by multiple access points.

In some aspects, whether an AP is a cluster leader or not may determine whether the AP performs a backoff procedure before the simultaneous transmission. For example, non-leader APs may not perform a backoff procedure, but instead may participate in the simultaneous transmission without first performing a backoff procedure. Such APs may determine whether the wireless medium (e.g., channel) is idle before transmitting. For example, an AP may determine whether the wireless medium is busy based on a clear channel assessment (CCA). In an aspect, an AP may determine that the wireless medium is idle by monitoring an energy level on the wireless medium (e.g., via "energy detect" (ED)). In another aspect, an AP may determine whether the wireless medium is busy by detecting a packet transmission on the wireless medium (e.g., "packet detect" (PD)). Further, APs may determine a state of the wireless medium so to track a Network Allocation Vector (NAV). In an aspect, the NAV may be set in a neighboring BSS. It should be understood that the systems described herein may implement any combination of NAV, ED, PD, and other mechanisms to determine whether the wireless medium is busy. In one example, as illustrated in FIG. 7, Member AP-1, Member AP-2, and Member AP-3 (also referred to in this example as "AP1," "AP2," and "AP3," respectively, or collectively, as "the APs") may all perform a backoff procedure during time period 702. In an aspect, the AP that is first to successfully complete the backoff procedure may send a multi-AP trigger. For example, if AP2 performs the backoff procedure before AP1 and AP3 perform the backoff procedure, AP2 may send the trigger frame 705. In this example, both AP1 and AP3 may refrain from sending a multi-AP trigger. As further described in connection with FIG. 8, timing for transmitting a multi-AP trigger (e.g., the trigger frame 705) and/or for performing the simultaneous transmission may also be dependent on the results of the backoff procedure. In other aspects, no backoff procedure may be performed, as further described in connection with FIG. 8.

After transmitting the trigger frame 705, the access point that transmitted the trigger frame may transmit data (e.g., downlink data) 715b on the single channel at the time indicated by the trigger frame 705. In certain embodiments, the access point which transmitted the trigger frame 705 can determine the time based on an addition of a time at an end of the trigger frame 705 transmission and a constant elapsed time after the time of trigger frame transmission. For example, the time separation between trigger frame transmission and data transmission can be a predefined time (e.g., SIFS). Thus, in FIG. 7, the time for coordination data transmission is shown as the end of the trigger frame 705 plus an additional SIFS value 710. Similarly, the one or more other access points that receive the trigger frame 705 can determine the time based on an end of the trigger frame 705 transmission by the access point (or based on the time of trigger frame receipt by the access point which received the trigger frame) and the same constant elapsed time (e.g., SIFS) after the time of trigger frame transmission (or receipt). In some aspects, the trigger frame may indicate a time independent of the time of trigger frame transmission. For example, in some aspects, the access points may synchronize their clocks, and the trigger frame may indicate a time based on the synchronized clocks, for example, via an offset.

In response, at least in part, to the trigger frame 705 at least some of the one or more other access points of the plurality of access points can transmit data (e.g., downlink data) on the single channel at the time indicated by the trigger frame. This data transmission from the one or more other access points can then be synchronized (e.g., simultaneous) with the data transmission by the access point which transmitted the trigger frame. For example, each of the one or more other access points (e.g., "member AP-1" and "member AP-3" of FIG. 7) of the plurality of access points can be performing a corresponding checking procedure (e.g., monitoring both physical CCA and virtual NAV) to check whether its carrier sense (CS) state is busy before transmitting data on the single channel. As schematically illustrated by FIG. 7, "member AP-1" determines that its CS state is not busy, so in response, at least in part, "member AP-1" performs the data transmission on the single channel, while "member AP-3" determines that its CS state is busy, so in response, at least in part, "member AP-3" does not perform the data transmission on the single channel.

The trigger frame can be a control frame that includes information that facilitates its use in certain embodiments described herein. For example, the trigger frame can be based on a control frame compatible with IEEE 802.11ax, modified to include such information. In certain embodiments, the information is indicative of one or more of the following: a set of access points responsive to the trigger frame (e.g., the cluster of access points, e.g., using a BSS identification number), an access category for the simultaneous transmissions, a channel bandwidth for the simultaneous transmissions of downlink (DL) multiple user (MU), and a duration of a downlink physical layer convergence procedure (PLCP) protocol data unit (PPDU) for the simultaneous transmissions. In some aspects, indicating information may include setting one or more fields of the trigger message to one or more predetermined values, including values indicating the information.

Figure 8:
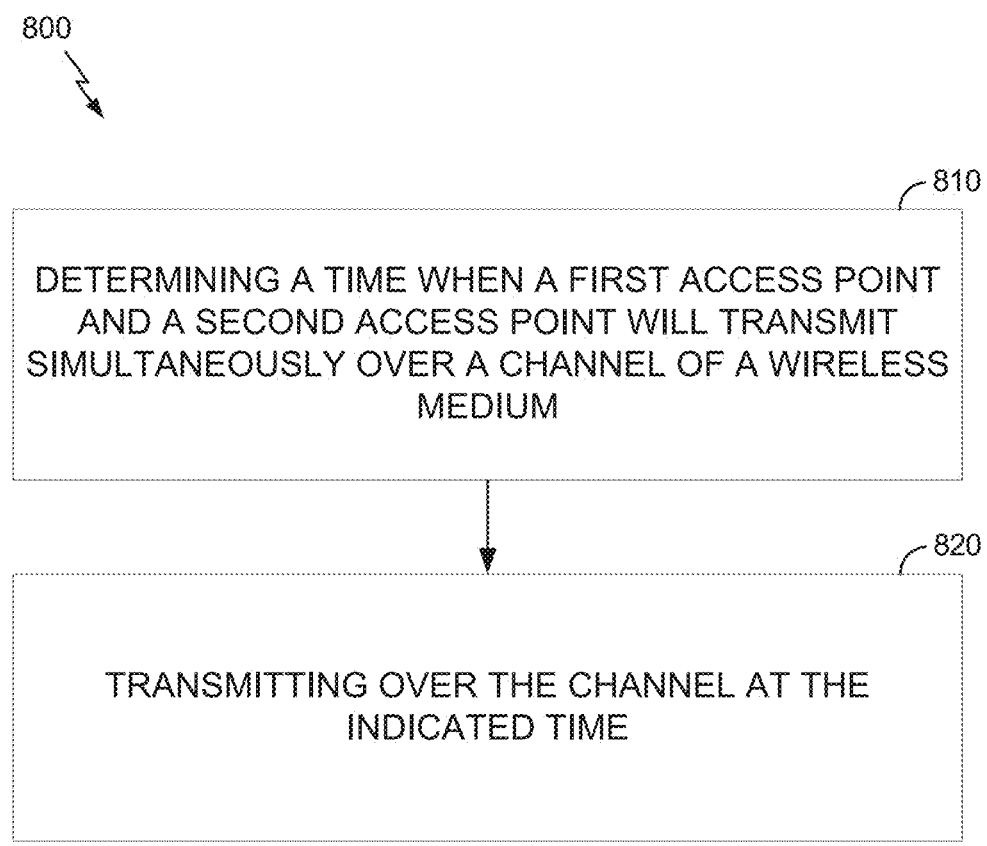
FIG. 8 is a flow diagram of an example method of transmitting data on a wireless network in accordance with certain embodiments described herein.

FIG. 8 is a flow diagram of an example method 800 of transmitting data on a wireless network (e.g., by sharing a channel of the wireless medium) in accordance with certain embodiments described herein. In some aspects, the method 800 discussed below with respect to FIG. 8 may be performed by the wireless device 202. For example, in some aspects, instructions stored in the memory 206 may configure the processor 204 to perform one or more of the functions discussed below with respect to FIG. 8.

Method 800 discussed below provides an exemplary method to coordinate simultaneous transmissions of two or more access points at the same time over a single channel of a wireless medium. By transmitting simultaneously, throughput of a wireless medium may be increased, due to increased parallelism between the two access points that may not occur with prior methods. To facilitate the simultaneous transmissions, the signals transmitted by each of the access points may be shaped to form a combined signal that may be properly received by the intended receiving devices. Thus, it can be beneficial to align these simultaneous transmissions such that the combined signal is formed in a beneficial manner.

In block 810, a time when a first access point and at least one second access point will transmit simultaneously over the channel is determined. In some aspects, the determination is based on a negotiation or coordination between at least the two access points. In some aspects, the time is comprised of two time values that are added, with one of the values being a constant, such as a SIFS time.

In block 820, a data transmission is performed over the channel at the time. In some aspects, the data transmission is performed at the time plus a constant offset, such as a short inter-frame space (SIFS) time.

In some aspects, a device performing method 800 may negotiate with other access points to determine which access point is a cluster leader. In some aspects, the device performing method 800 may receive this information instead via configuration data. In some aspects, cluster leader access points are responsible for transmitting trigger frames indicating the time of the simultaneous transmission discussed above. Non-leader access points may receive the trigger frame and participate in the simultaneous transmission based on parameters included in the trigger frame. Whether the access point is a cluster leader or not may also determine whether the access point performs a backoff procedure before the simultaneous transmission. For example, non-leader access points may not perform a backoff procedure, but instead may participate in the simultaneous transmission within backing off beforehand. These access points may check whether the medium (channel) is idle or not before transmitting in some aspects.

Thus, in some aspects of method 800, a trigger frame is generated and transmitted over the wireless medium. In some aspects, the time is set to a predetermined time value. In some aspects, the time is set to a time value indicated by the trigger frame (e.g., the trigger frame indicates the time) and is generated to indicate that the at least one second access point (e.g., a plurality of second access points) is to transmit at the time. For example, the trigger frame may include at least one BSS ID of the at least one second access point. Alternatively, the trigger frame may include a cluster identifier, with the cluster identifier identifying a cluster of which the at least one second access point is a part.

In some aspects, the method 800 includes performing a backoff procedure on the single channel before the time. If the backoff procedure completes successfully, the trigger frame may be generated and transmitted. The time may also be dependent on the results of the back off procedure. If the backoff procedure does not complete successfully, the backoff procedure may be restarted until it does complete successfully, at which time the time for the simultaneous transmission may be determined, and the trigger frame may be generated and transmitted.

In some aspects, the trigger frame is received instead of being generated and transmitted. For example, in some aspects, a device performing method 800 may be a cluster controller and leader. In these aspects, the trigger frame may be generated and transmitted, since a cluster leader may control simultaneous transmissions by multiple access points in some embodiments. In other aspects, for example if the device performing method 800 is not a cluster leader, the device may receive a trigger frame from the cluster leader access point, or another device in some aspects. In some aspects, the received trigger frame can indicate the time. For example, the determination of the time in block 810 may be based on a time indicated in the received trigger frame in these aspects.

In aspects of method 800 that receive a trigger frame, no backoff procedure may be performed. Instead, a device receiving a trigger frame may check whether the channel is idle immediately before the time. If the channel is idle, the transmission of block 820 may occur. In other aspects, if the channel is not idle at the time (or immediately before), then the transmission of block 820 may not occur. Thus, block 820 is not performed in these aspects.

In some aspects, the received trigger frame is decoded to determine if the trigger frame identifies the device performing method 800. If it does, the device may transmit at the time based on the trigger frame identifying the device (assuming the medium is idle before the time). In some aspects, the transmission is performed based on a time indicated in the trigger frame plus a constant value, such as SIFS.

Whether the trigger frame is generated and transmitted, or received in the various aspects of method 800 discussed above, the trigger frame may indicate information indicative of one or more of the following: a set of access points responsive to the trigger frame, an access category for the simultaneous transmissions, a channel bandwidth for the simultaneous transmissions, and a duration of a downlink physical layer convergence procedure (PLCP) protocol data unit (PPDU) for the simultaneous transmissions. The simultaneous transmission of block 820 may then be performed based on one or more of these indications.

Further disclosed herein is a non-transitory computer-readable medium comprising instructions that, when executed, perform a method for coordinating simultaneous transmission of two or more access points over a single channel of a wireless medium, the method comprising: determining, by a first access point, a time when the first access point and at least one second access point will transmit simultaneously over the channel; and transmitting, by the first access point, a data portion of a distributed MIMO communication over the channel at the time. In an aspect, the at least one second access point comprises a plurality of second access points. In an aspect, the method further comprises generating, by the first access point, a trigger frame; and transmitting, by the first access point, the trigger frame over the wireless medium. In an aspect, determining the time comprises setting the time to a predetermined time value. In an aspect, determining the time comprises setting the time to a time value indicated by the trigger frame. In an aspect, the method further comprises generating, by the first access point, the trigger frame to indicate the at least one second access point is to transmit at the time. In an aspect, the method further comprises performing, by the first access point, a backoff procedure on the single channel, wherein the transmitting of the trigger frame is in response to completion of the backoff procedure. In an aspect, the method further comprises receiving, by the first access point, a trigger frame. In an aspect, the trigger frame indicates the time. In an aspect, the method further comprises determining, by the first access point, whether the channel is idle prior to said transmitting, wherein said transmitting is in response to the channel being idle. In an aspect, the method further comprises decoding, by the first access point, the trigger frame to determine if the trigger frame identifies the first access point, wherein said transmitting at the time is based on the trigger frame identifying the first access point. In an aspect, the determining of the time is based on addition of a time indicated by the trigger frame and a constant value. In an aspect, the trigger frame is generated to include information indicative of one or more of the following: a set of access points responsive to the trigger frame, an access category for the simultaneous transmission, a channel bandwidth for the simultaneous transmission, and a duration of a downlink physical layer convergence procedure (PLCP) protocol data unit (PPDU) for the simultaneous transmission. In an aspect, the method further comprises negotiating with the at least one second access point to determine whether the first access point is to transmit the trigger frame; and transmitting the trigger frame in response to said negotiating.

Further disclosed herein is a non-transitory computer-readable medium comprising instructions that, when executed, perform a method of coordinating transmission by a plurality of access points over a single channel of a wireless medium, the method comprising: determining, by a device, a time when a first access point and at least one second access point will transmit simultaneously over the channel; and transmitting, by the device, a trigger message. In an aspect, determining the time comprises setting the time to a predetermined time value. In an aspect, determining the time comprises setting the time to a time value indicated by the trigger message. In an aspect, the device is a station. In an aspect, the device is an access point. In an aspect, the time is SIFS after an end of said transmitting of the trigger message. In an aspect, the trigger message is generated by the device to include information indicative of one or more of the following: a set of access points responsive to the trigger message, an access category for the simultaneous transmission, a channel bandwidth for the simultaneous transmission, and a duration of a downlink physical layer convergence procedure (PLCP) protocol data unit (PPDU) for the simultaneous transmission. In an aspect, the method further comprises generating the trigger message to identify the first access point and the at least one second access point via corresponding identifiers for the first access point and the at least one second access point. In an aspect, the identifiers are one of: BSS IDs, station addresses, etc.

Terminology

In the above description, reference numbers may have been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor or any commercially available processor, controller, microcontroller or state machine. A processor may also be implemented as a combination of computing devices (e.g., a combination of a DSP and a microprocessor, a plurality of microprocessors, one or more microprocessors in conjunction with a DSP core, or any other such configuration).

In one or more aspects, the functions described may be implemented in hardware, software, firmware, or any combination thereof. If implemented in software, the functions may be stored on or transmitted over as one or more instructions or code on a computer-readable medium.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method of coordinating simultaneous transmission over a single channel of a wireless medium, the method comprising:
    performing, by a first access point associated with a first basic service set (BSS), a countdown procedure simultaneously with a second access point associated with a second BSS, wherein the first and second access points are each capable of initiating a simultaneous transmission of a distributed multiple-input and multiple-output (MIMO) communication from the first and second access points, the distributed MIMO communication comprising the first access point transmitting, to the second access point, first communications configured to facilitate second communications between the second access point and one or more wireless stations included in the second BSS;
    in response to completing the countdown procedure before the second access point, transmitting, from the first access point to the second access point, a first frame indicating that the simultaneous transmission will occur at a predetermined amount of time after a receipt of the first frame;
    determining, by the first access point, that the single channel is idle; and
    after the predetermined amount of time, transmitting over the single channel, from the first access point, and simultaneously with the second access point, data for the distributed MIMO communication.

2. The method of claim 1, further comprising:
    generating, by the first access point, the first frame.

3. The method of claim 2, wherein the predetermined amount of time is at least one of set by the first access point and the at second access point or a short interframe space (SIFS).

4. The method of claim 1, further comprising:
    generating, by the first access point, the first frame.

5. The method of claim 1, further comprising:
    generating the first frame, by the first access point, to include information indicative of at least one of a set of wireless devices responsive to the first frame, an access category, a channel bandwidth, or a duration of a downlink physical layer convergence procedure (PLCP) protocol data unit (PPDU).

6. The method of claim 1, further comprising:
    establishing, based on one or more communications between the first and second access points, that the first access point will transmit the first frame.

7. The method of claim 1, further comprising:
    determining, by the first access point, a time when the first and second access points will simultaneously transmit over the single channel.

8. The method of claim 7, further comprising:
    generating the first frame to identify the first and second access points via corresponding identifiers that are at least one of basic service set (BSS) identifiers or station addresses.

9. An apparatus for coordinating simultaneous transmissions over a single channel of a wireless medium, the apparatus being associated with a first basic service set (BSS) and comprising:
one or more processors; and
a memory comprising instructions that, when executed by the one or more processors, cause the apparatus to:
perform a countdown procedure simultaneously with an access point associated with a second BSS, wherein the apparatus and the access point are each capable of initiating a simultaneous transmission of a distributed multiple-input and multiple-output (MIMO) communication from the apparatus and the second access point, the distributed MIMO communication comprising the apparatus transmittinq, to the access point, first communications configured to facilitate second communications between the access point and one or more wireless stations included in the second BSS;
in response to completing the countdown procedure before the access point, transmit, to the access point, a first frame indicating that the simultaneous transmission will occur at a predetermined amount of time after a receipt of the first frame;
determine that the single channel is idle; and
after the predetermined amount of time, transmit over the single channel, simultaneously with the access point, data for the distributed MIMO communication.

10. The apparatus of claim 9, wherein execution of the instructions further causes the apparatus to:
generate the first frame.

11. The apparatus of claim 10, wherein the predetermined amount of time is at least one of set by the apparatus and the access point or a short interframe space (SIFS).

12. The apparatus of claim 9, wherein execution of the instructions further causes the apparatus to:
generate the first frame.

13. The apparatus of claim 9, wherein execution of the instructions further causes the apparatus to:
generate the first frame to include information indicative of at least one of a set of wireless devices responsive to the first frame, an access category, a channel bandwidth, or a duration of a downlink physical layer convergence procedure (PLCP) protocol data unit (PPDU).

14. The apparatus of claim 9, wherein execution of the instructions further causes the apparatus to:
establish, based on one or more communications between the apparatus and the access point, that the apparatus will transmit the first frame.

15. The apparatus of claim 9, wherein execution of the instructions further causes the apparatus to:
determine a time when the apparatus and the access point will simultaneously transmit over the single channel.

16. The apparatus of claim 9, wherein execution of the instructions further causes the apparatus to:
generate the first message to identify the apparatus and the access point via corresponding identifiers that are at least one of basic service set (BSS) identifiers or station addresses.

* * * * *